US008930045B2

(12) United States Patent
Oman et al.

(10) Patent No.: US 8,930,045 B2
(45) Date of Patent: Jan. 6, 2015

(54) RELAY ATTACK PREVENTION FOR PASSIVE ENTRY PASSIVE START (PEPS) VEHICLE SECURITY SYSTEMS

(71) Applicant: Delphi Technologies, Inc., Troy, MI (US)

(72) Inventors: Todd P. Oman, Greentown, IN (US); Kevin J. Hawes, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 13/874,519

(22) Filed: May 1, 2013

(65) Prior Publication Data

US 2014/0330449 A1 Nov. 6, 2014

(51) Int. Cl.
*G05D 1/00* (2006.01)
*B60R 25/10* (2013.01)
*B60R 25/01* (2013.01)

(52) U.S. Cl.
CPC .................................... *B60R 25/01* (2013.01)
USPC ........................................ 701/2; 340/426.36

(58) Field of Classification Search
USPC ................... 701/2; 340/426.36, 644
See application file for complete search history.

(56) References Cited

U.S. PATENT DOCUMENTS

| 7,301,467 | B2 * | 11/2007 | Ishimura et al. | 340/644 |
|---|---|---|---|---|
| 7,791,457 | B2 * | 9/2010 | Ghabra et al. | 340/426.36 |
| 8,319,605 | B2 | 11/2012 | Hassan et al. | |
| 8,373,581 | B2 | 2/2013 | Hassan et al. | |
| 8,698,605 | B2 * | 4/2014 | Kim | 340/10.41 |
| 2005/0024181 | A1 * | 2/2005 | Hofbeck et al. | 340/5.7 |
| 2006/0083406 | A1 * | 4/2006 | Ishimura et al. | 382/106 |
| 2008/0061929 | A1 * | 3/2008 | Cromer et al. | 340/5.61 |
| 2010/0076622 | A1 | 3/2010 | Dickerhoof et al. | |
| 2010/0265035 | A1 | 10/2010 | Ziller | |
| 2011/0078549 | A1 * | 3/2011 | Thueringer et al. | 714/807 |
| 2012/0268242 | A1 * | 10/2012 | Tieman et al. | 340/5.61 |
| 2013/0143594 | A1 * | 6/2013 | Ghabra et al. | 455/456.1 |
| 2013/0342379 | A1 * | 12/2013 | Bauman et al. | 342/21 |

FOREIGN PATENT DOCUMENTS

| WO | 2005/088561 A3 | 9/2005 |
|---|---|---|
| WO | 2005/114593 A1 | 12/2005 |

* cited by examiner

*Primary Examiner* — Thomas G Black
*Assistant Examiner* — Tyler Paige
(74) *Attorney, Agent, or Firm* — Lawrence D. Hazelton

(57) ABSTRACT

A passive entry passive start (PEPS) vehicle security system configured to thwart a relay attack on the system. The system includes one or more ultra wideband transceivers (UWBX) installed on a vehicle and configured to transmit a request pulse at a request time. A mobile UWBX, possibly installed in a nomadic device such as a smart phone, is configured to transmit a reply pulse in response to the request pulse. A controller is configured to determine a distance between each UWBX and the mobile UWBX based on a time interval between the request time and a time that corresponds to when the reply pulse is received by the each UWBX. The controller may also be configured to unlock doors of the vehicle only if the distance is less than an unlock threshold.

13 Claims, 5 Drawing Sheets

RELAY ATTACK PREVENTION FOR PASSIVE ENTRY PASSIVE START (PEPS) VEHICLE SECURITY SYSTEMS

TECHNICAL FIELD OF INVENTION

This disclosure generally relates to a passive entry passive start (PEPS) vehicle security system, and more particularly relates to using ultra wideband transceivers (UWBX) to determine a distance based on a round trip time of flight (TOF) measurement of a request pulse and a reply pulse.

BACKGROUND OF INVENTION

Typical features of passive keyless entry/passive start (PEPS) security systems for vehicles are that the vehicle doors automatically unlock when an authorized key fob is brought near the vehicle, and the vehicle can be started by pressing a button instead of using a key if the key fob is within the vehicle. It has been discovered that some PEPS systems can be deceived using a two-transceiver/two-person method commonly called a 'relay attack'. The method deceives the vehicle security system by relaying the normally short-range request/reply communications commonly associated with PEPS systems over relatively long distance without the owner's knowledge. One relay device is located close to the car and a second relay device is positioned close to the car owner carrying a PEPS key fob. Then, in response to pulling a door handle or pushing a start button, the first relay receives a request signal transmitted by the vehicle security system, and relays the information to the second unit relay unit. The second relay unit retransmits the signal to the PEPS key fob. The PEPS key fob will automatically reply to this retransmitted signal which is relayed back to the vehicle to unlock the door or allow the vehicle to be started.

SUMMARY OF THE INVENTION

Described herein is a passive entry and passive start (PEPS) system that employs an Ultra Wideband (UWB) communication protocol. The UWB protocol is able to determine accurately a distance (e.g. +/−2 mm unobstructed) between one or more UWBXs on a vehicle, and a UWBX in a nomadic device such as a key fob or smart phone. A feature of the UWB communication protocol is that communication is by way of pulses or bursts of electromagnetic energy that spread the signal from a UWBX across a wider spectrum of frequency than is typically the case for communications protocols that transmit at a particular carrier frequency. The spreading of the signal across a wider band enhances the security of the transmission. A relay attack is thwarted by measuring the time of flight (TOF) for a signal to travel from the vehicle to the nomadic device and to the vehicle. Any TOF delay caused by the nomadic device responding to a request from the vehicle is assumed to be fixed, and so the round trip TOF can be used to determine a distance between the vehicle and the nomadic device. By determining the distance between the vehicle and the nomadic device, actions such as unlocking the vehicle doors by a relay attack can be prevented as it can be surmised if the vehicle owner carrying the nomadic device is further away from the vehicle than a predetermined distance.

UWB pulse or signals differ from widely used narrowband by their relatively large bandwidths. A common signaling scheme for UWB systems is known as impulse radio (IR) UWB, which consists of short duration pulses (on the order of a nanosecond) with low duty cycles, and employs different time-hopping and polarity codes. UWB signals have some very important properties which make them good candidates for many applications. First, due to their large absolute bandwidths, UWB systems can employ very short duration waveforms, and hence, they can achieve high time resolution and facilitate accurate range and position estimation. Large bandwidths of UWB signals also enable high-speed data transmission. In addition, since UWB signals can cover a large portion of the frequency spectrum, including low as well as high frequencies (i.e., they can have large relative bandwidths), they achieve high penetration capability through obstacles. Furthermore, UWB systems can be operated in baseband in a carrier-free manner, which makes it possible to design low-cost and low-power systems. Also, UWB systems have greater immunity to multi-path errors common in typical narrow band systems. Due to their high time resolution, UWB signals can be employed in applications that require high positioning accuracy.

In accordance with one embodiment, a passive entry passive start (PEPS) vehicle security system configured to thwart a relay attack on the system is provided. The system includes a first ultra wideband transceiver (UWBX), a mobile UWBX, and a controller. The first UWBX is installed on a vehicle and is configured to transmit a request pulse at a request time. The mobile UWBX is installed in a nomadic device and is configured to transmit a reply pulse in response to the request pulse. The controller is configured to determine a distance between the first UWBX and the mobile UWBX based on a first time interval between the request time and a first time that corresponds to when the reply pulse is received by the first UWBX. The controller is further configured to unlock doors of the vehicle only if the distance is less than an unlock threshold.

In another embodiment, a passive entry passive start (PEPS) vehicle security controller configured to thwart a relay attack on a PEPS system is provided. The controller includes a processor configured to operate one or more UWBXs to determine a distance between a first UWBX coupled to the controller and a mobile UWBX located apart from the controller. The distance is based on a first time interval between a request time that corresponds to when the first UWBX transmits a request pulse at a request time, and a first time that corresponds to when a reply pulse is received by the first UWBX from the mobile UWBX. The controller is further configured to unlock doors of the vehicle only if the distance is less than an unlock threshold.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
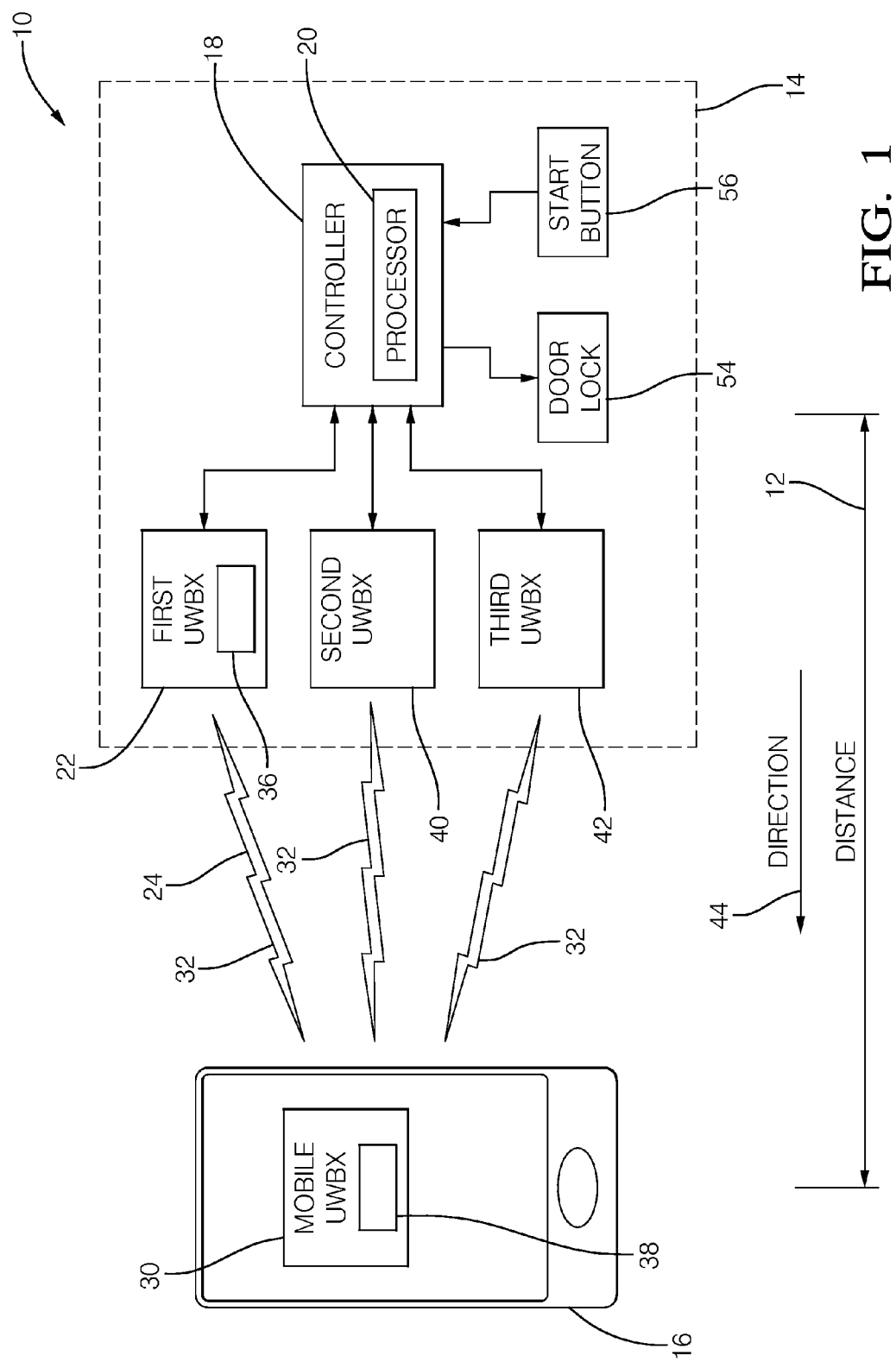
FIG. 1 is a diagram of a passive entry passive start (PEPS) system in accordance with one embodiment.

FIG. 1 illustrates a non-limiting example of a passive entry passive start (PEPS) vehicle security system, hereafter the system 10. As will become apparent in the description that follows, the system 10 is generally configured to thwart a relay attack on the system 10 by determining a distance 12 between a vehicle 14 and a nomadic device 16. As used herein, nomadic device may be anything that an operator (not shown) of the vehicle 14 carries on his/her person. By way of example and not limitation, the nomadic device may be a key fob, a smart phone, a communication device accessory as set forth in United States Published Application 2012/0172010 by Oman published Jul. 5, 2012, a tablet, a wrist watch, or other personal object that can be equipped as described below.

The system generally includes a controller 18. The controller 18 may include a processor 20 such as a microprocessor or other control circuitry as should be evident to those in the art. The controller 18 may include memory (not shown) including non-volatile memory, such as electrically erasable programmable read-only memory (EEPROM) for storing one or more routines, thresholds and captured data. The one or more routines may be executed by the processor 20 to perform steps for operating one or more ultra wideband transceivers (UWBXs) on the vehicle 14 to determine a distance and/or direction to the nomadic device 16 based on signals output and received by the controller 18 from the one or more UWBXs as described herein. A suitable example of a UWBX is a PULSEON™ P410 available from Time Domain of Huntsville, Ala.

Figure 2:
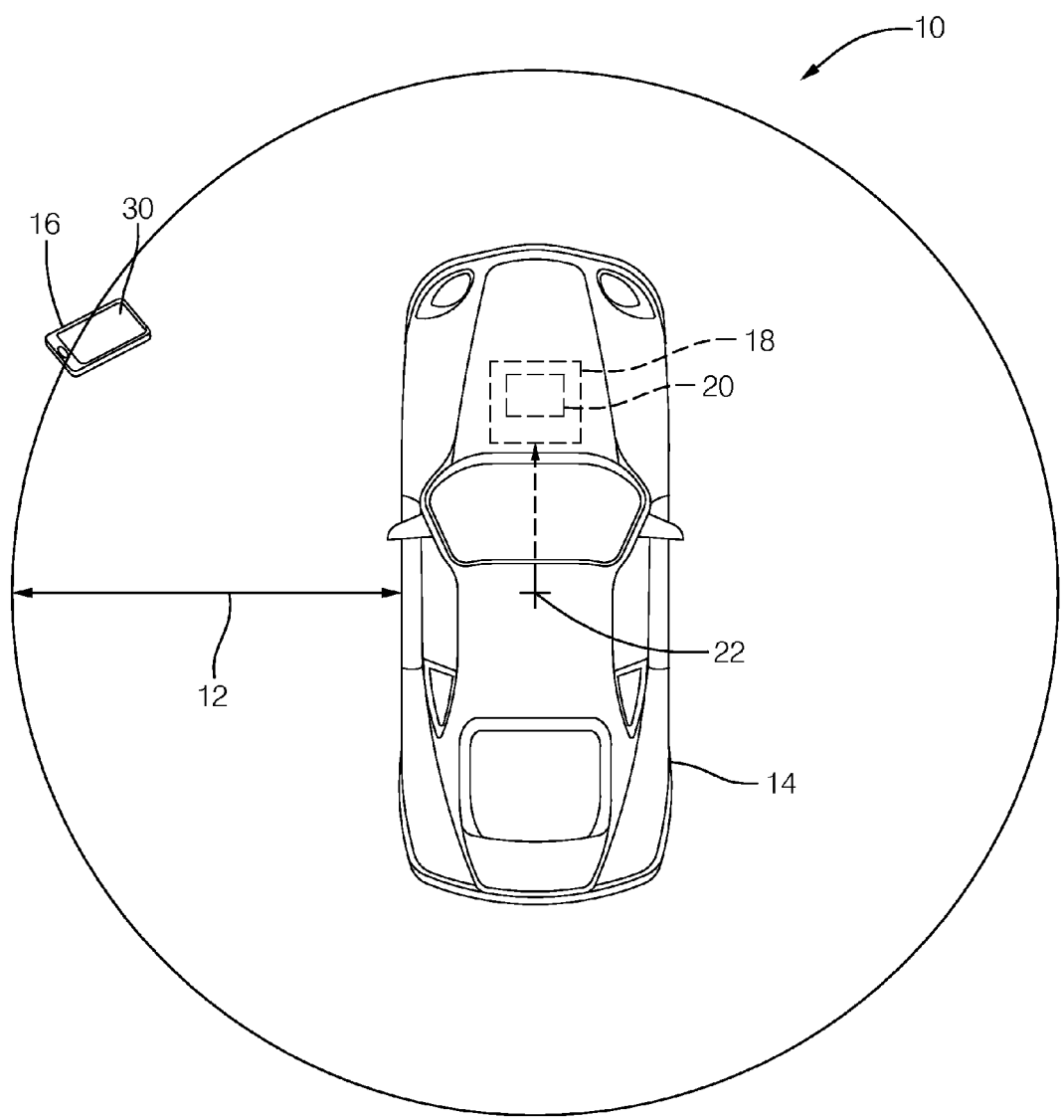
FIG. 2 is a top view of a vehicle equipped with the PEPS system of FIG. 1 in accordance with one embodiment.
Figure 5:
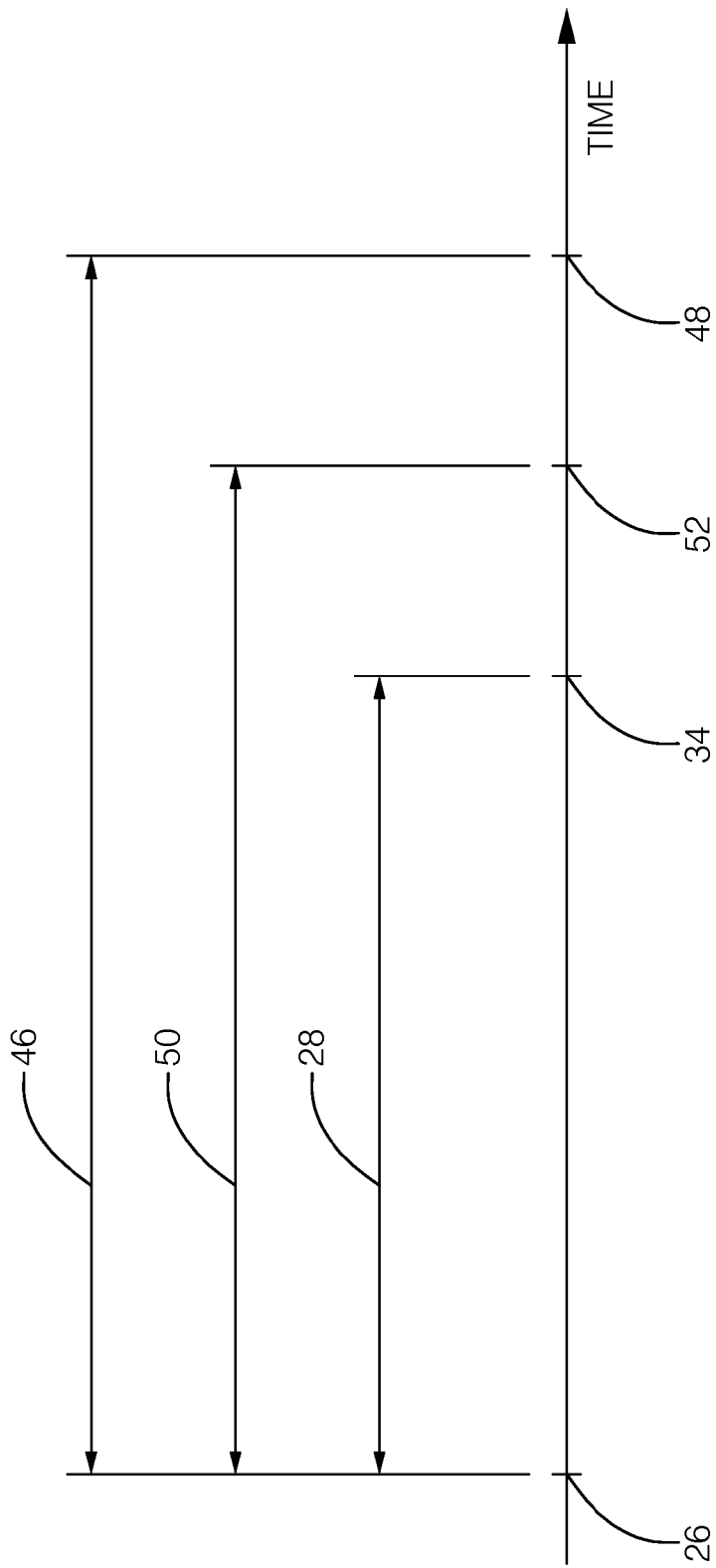
FIG. 5 is a timing diagram of signals present the PEPS system of FIG. 1 in accordance with one embodiment.

FIG. 2 illustrates a non-limiting example of a first UWBX 22 installed at a central location of the vehicle 14, for example as part of a rear view minor assembly (not shown), and optionally coupled to an antenna (not shown) on top of the vehicle 14. The circle around the vehicle 14 indicates the potential locations of the nomadic device 16 equipped with the mobile UWBX 30. In general, the first UWBX 22 is electrically coupled to the controller 18 in a manner effective for the first UWBX 22 to be operated by the controller 18 and send signals to the controller 18. The electrical coupling may be by way of wires, fiber optics, or wireless connection, as will be recognized by those in the art. In particular, the controller 18 and the first UWBX 22 cooperate to transmit a request pulse 24 at a request time 26 (FIG. 5). As used herein, the request pulse 24 is an electromagnetic signal emitted by the first UWBX 22 in accordance with UWB communication protocols. However, this does not exclude emissions of other pulses by other UWBXs on the vehicle 14. In general, the request time 26 marks the beginning of a first time interval 28 use to determine a distance between the vehicle 14 and the nomadic device 16.

The controller 18 is shown separated from the first UWBX 22 only for the purpose of illustration. It is recognized that the controller 18 and the first UWBX 22 may be integrated into a single housing (not shown). A single housing may be preferable to minimize signal propagation delays caused by having the controller 18 and the first UWBX 22 at separate locations on the vehicle 14.

The system 10 also includes a mobile UWBX 30, preferably installed in the nomadic device 16 and configured to transmit a reply pulse 32 in response to the request pulse 24. The mobile UWBX 30 may be the same make and model as the first UWBX 22, or it may be a specialized device particularly well suited for being installed in the nomadic device 16. For example, the mobile UWBX 30 may be configured so that the physical orientation of the mobile UWBX 30 does not interfere with the ability to transmit the reply pulse 32.

The first UWBX 22 may also be configured to detect the reply pulse 32 emitted by the mobile UWBX 30, and communicate that detection to the controller 18. The controller 18 may be further configured to determine the distance 12 between the first UWBX 22 and the mobile UWBX 30 based on the first time interval 28 (FIG. 5) between the request time 26 and a first time 34 that corresponds to when the reply pulse 32 is received by the first UWBX 22. By determining the distance 12, the controller 18 can surmise if the nomadic device 16 is close enough to the vehicle for an owner or operator of the vehicle to see if some thief is trying to access the vehicle 14. For example, the controller 18 may be further configured to unlock doors of the vehicle 14 only if the distance 12 is less than an unlock threshold, for example one meter (1 m).

It should be recognized that using UWBXs to determine a time-of-flight (TOF) of the request pulse 24 and the reply pulse 32 allows for the distance 12 to be determined with greater accuracy than other PEPS systems that rely on signal strength to estimate distance. While not subscribing to any particular theory, estimating distance based on signal strength has limited accuracy because multipath, interposed objects, antenna orientation, clothing, and other factors influence signal strength in an unpredictable manner. In contrast, measuring TOF to determine the distance 12 is generally not influenced by these factors, and so the distance 12 can be determined with more accuracy by using UWBXs.

The request pulse 24 may include a vehicle identification 36 such as a vehicle identification number (VIN) or a serial number of the first UWBX 22. The vehicle identification 36 may be stored in the first UWBX 22, or communicated to the first UWBX 22 by the controller 18. Transmitting the vehicle identification 36 may be advantageous because the mobile UWBX 30 may be configured to only respond if a signal received by mobile UWBX includes a proper vehicle identification, and so would not waste battery power or unnecessarily clutter the airwaves by responding to a request pulse from some unknown source.

Similarly, the reply pulse 32 may include a nomadic device identification 38 such as a serial number of the mobile UWBX 30, a code entered into the mobile UWBX via the smart phone into which it is installed, or a code derived from the vehicle identification 36 using a secret algorithm. Transmitting the nomadic device identification 38 may be advantageous to improve the security of the system 10 by requiring the mobile UWBX 30 to be properly recognized by the controller 18. Alternatively, the reply pulse 32 may include the nomadic device identification and the vehicle identification 36, where the vehicle identification 36 may either be stored in the mobile UWBX, or be the vehicle identification 36 received in the request pulse 24. As such, the reply pulse 32 may include a vehicle identification 36 from the request pulse 24.

Continuing to refer to FIG. 2, the distance 12 is illustrated and discussed elsewhere herein as being from the vehicle 14 to the nomadic device 16. However, it should be appreciated that for this example the actual distance is based on the distance between the first UWBX 22 and the mobile UWBX 30. Having a single UWBX on the vehicle 14 (e.g. the first UWBX 22) may be sufficient when the distances of interest from the vehicle are relatively large (e.g. >1 m) and/or the direction from the vehicle 14 to the nomadic device 16 is not of interest. However, if the distances are relatively short as is the case when trying to determine if the nomadic device 16 is inside or outside the vehicle 14, or if the direction the nomadic device 16 relative to the vehicle 14 is desired, then the system 10 may require more than one UWBX.

Figure 3:
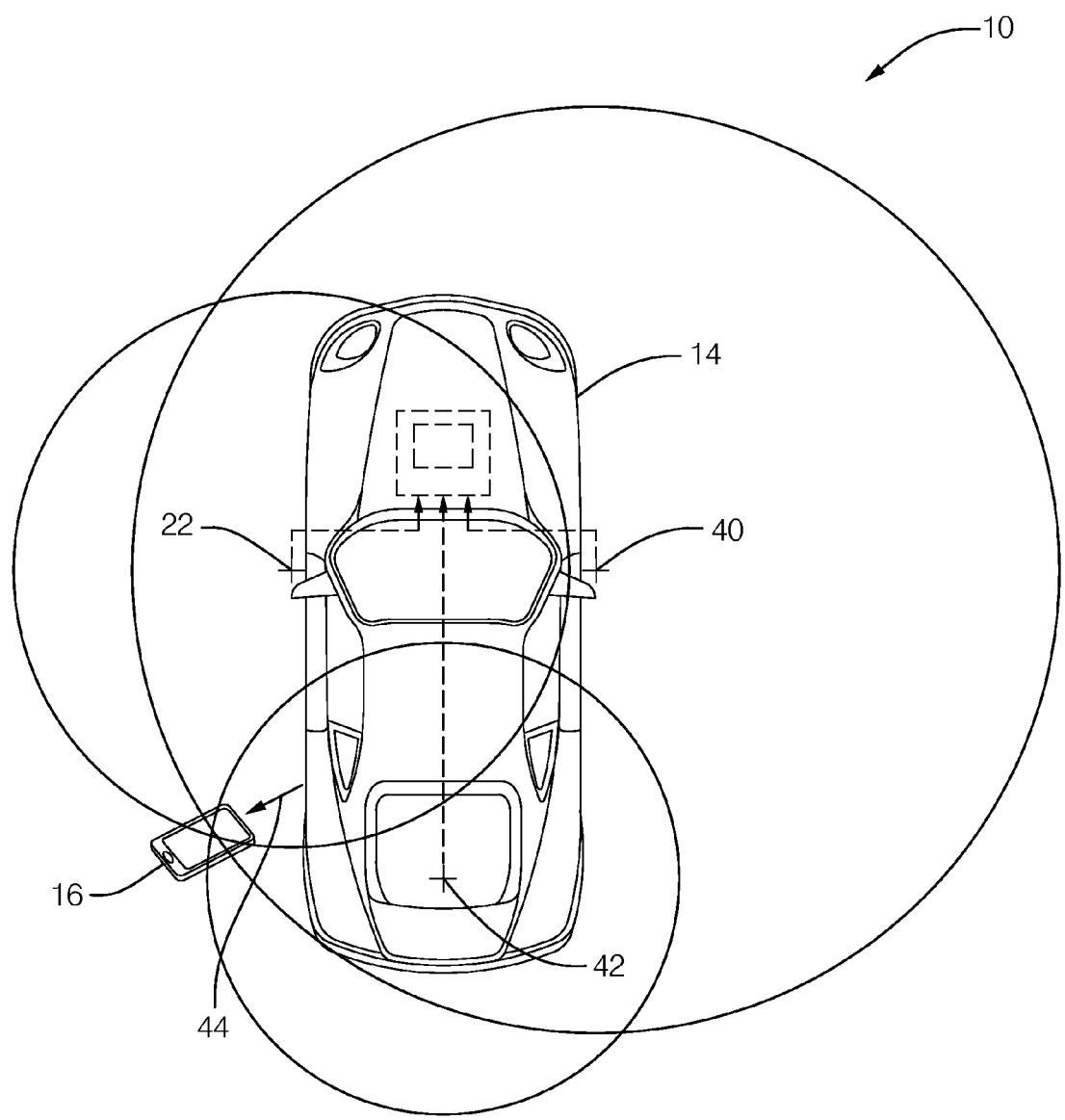
FIG. 3 is a top view of a vehicle equipped with the PEPS system of FIG. 1 in accordance with one embodiment.

FIG. 3 illustrates a non-limiting example of the system 10 with the first UWBX 22 mounted on the vehicle proximate to the driver's (left) side view minor. Such a mounting location may be advantageous since an operator (not shown) carrying the nomadic device 16 typically approaches the vehicle 14 from the driver's (left) side of the vehicle 14, and so the proximity of the operator (i.e. the nomadic device 16) to the driver's (left) door may be better estimated. In this non-limiting example, the system 10 also optionally includes a second UWBX 40 and a third UWBX 42. The circles centered on each of the UWBXs indicates a distance to the nomadic device 16 indicated by the differences in time that the reply pulses 32 are received by each of the UWBXs. It should be appreciated that a system equipped with a single UWBX generally cannot determine a direction 44 of the nomadic device 16 relative to the vehicle 14. However, by determining a location where the circles intersect, the direction 44 can be determined in addition to the distance 12.

If the system 10 is configured with only two transceivers, for example the first UWBX 22 and the second UWBX 40 located on the vehicle as shown, the system 10, in most instances, can only indicate the direction as to one of two choices. For example, if the nomadic device is directly forward of the vehicle 14 (i.e—due North of the vehicle 14), the system could indicate that the nomadic device 16 is North or South of the vehicle 14, but can't definitely determine which of the two directions is correct. Likewise, if the nomadic device 16 is located as shown in FIG. 3, the system could indicate that the nomadic device is either Southwest or Southeast of the vehicle 14. It should be recognized that if the nomadic device was located due West of the vehicle, the system 10 could specifically indicate the direction correctly as West. As such, if the vehicle is equipped with two UWBXs, the controller 18 may be configured to determine a direction from the vehicle 14 to the nomadic device 16 based on the first time interval 28 and a second time interval 46 (FIG. 5) between the request time 26 and a second time 48 that corresponds to when the reply pulse 32 is received by the second UWBX 40.

If the system 10 is configured with three transceivers, for example the first UWBX 22, the second UWBX 40, and the third UWBX 42 located on the vehicle as shown, the system 10 can distinctly determine the direction 44 using the known technique of triangulation. Accordingly, the controller 18 may be configured to further determine the direction 44 from the vehicle 14 to the nomadic device 16 based on the first time interval 28, the second time interval 46, and a third time interval 50 (FIG. 5) between the request time 26 and a third time 52 that corresponds to when the reply pulse 32 is received by the third UWBX 42. Alternatively, the system 10 may be configured so each of the UWBXs on the vehicle 14 take turns transmitting the request pulse, and so the relationship between each of the signals received by the controller 18 would need to be considered to determine the distance 12 and the direction 44.

Once the distance 12 and/or the direction 44 are known, the system 10 or the controller 18 may be further configured to operate the vehicle 14 in a manner that increases the security of the vehicle and/or the convenience of the vehicle 14 for the owner or operator of the vehicle 14. For example, referring again to FIG. 1, in addition to the controller 18 being configured to unlock doors of the vehicle 14 only if the distance 12 is less than an unlock threshold (e.g. −1 m), the controller 18 may be further configured to prevent unlocking of a door lock 54 of the vehicle 14 if the distance is greater than a lock threshold, three meters (3 m) for example. The lock threshold is preferably greater than the unlock threshold to provide hysteresis so that the vehicle doors are not unnecessarily locked and unlocked as could happen if the thresholds were equal.

Figure 4:
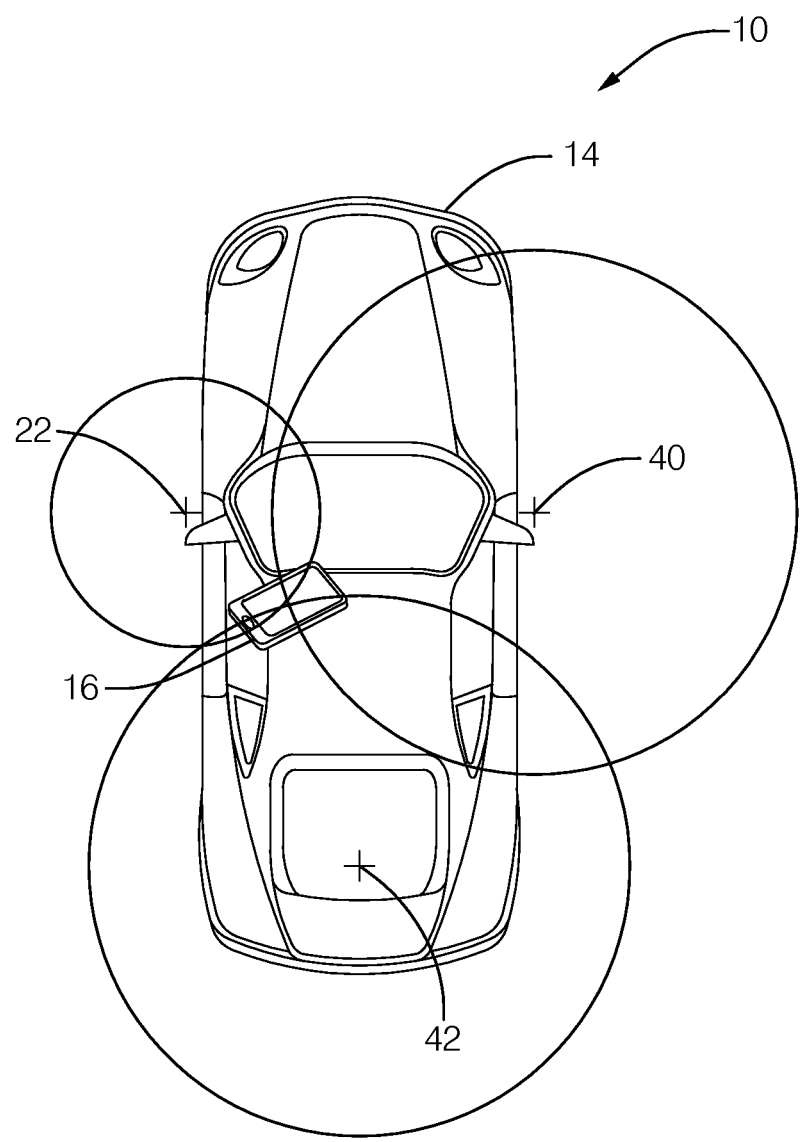
FIG. 4 is a top view of a vehicle equipped with the PEPS system of FIG. 1 in accordance with one embodiment.

FIG. 4 illustrates a non-limiting example of the vehicle 14 equipped with the three UWBXs shown in FIG. 3, but now the nomadic device 16 is within the vehicle 14. The other parts of the system 10 are not shown only to simplify the illustration. Based on signals received from the three UWBXs, the controller can determine that the nomadic device 16 is within the vehicle 14, and so the system 10 is operated to allow passive starting of the vehicle by pressing a start button 56 (FIG. 1) only if the distance 12 and direction 44 indicates that the nomadic device 16 is inside the vehicle 14. It follows that starting of the vehicle 14 would be prevented if the nomadic device 16 was determined to be outside of the vehicle 14.

By way of further example and not limitation on the system 10, the arrangement of the three UWBXs may be configured to function for ranging and communications to an active tag (electronic key) and for short range (less than 10 m) detection of passive targets such as pedestrians or inanimate objects around the vehicle to allow for the implementation of the functions described below by a single set of hardware to provide vehicle interior and exterior sensing. Interior sensing functions may include: Intrusion Sensing, Child Left Behind sensing, Occupant Presence sensing for seat belt or airbag deploy, and Occupant state of health (posture) sensing. Exterior sensing functions may include: Object Detection and motion sensing, Blind Zone Detection, Backup Aid, Security Detection, Operator protection, Vehicle protection, Pre-crash Detection and protective device deployment safing for frontal, side, or rear impact, Vehicle Dynamics determination, loss of control, Passive Approach Lighting (software definable approach area geometries), Passive Entry wake-up and key verification, Passive Trunk Release, Passive Lift-gate open and close, Vehicle to Vehicle Communications, Vehicle to Infrastructure Communications, Tire Pressure Sensor location determination.

The active tag mode employed to realize the Passive Entry and Passive Start functions can be used for additional location-based functions including, but not limited to Passive Approach Lighting, Passive Entry wake-up and key verification, Passive Trunk Release, Passive Lift-gate open & close, Passive Window open & close, Vehicle to Vehicle Communications, Vehicle to Infrastructure Communications, & Tire Pressure Sensor location determined automatically. These functions are extensions of the PEPS functionality with the exception of the latter. Tire pressure sensor programming is a problematic procedure usually requiring the service technician to activate the tire sensors in a sequencing procedure which allows the vehicle to learn the locations of the respective RF ID's of each tire to a dedicated location on the car (i.e. right front RF, LF, RR, LR). Typically, this can be done with a magnet to each sensor. Often this process is incorrectly done or not completed. Some systems have a costly dedicated receive antenna near each wheel. With a UWBX installed in each tire to communicate with the vehicle's UWBX(s), the system 10 can automatically determine the position of the tire transponder (and ID) by time of flight triangulation between the vehicle Ultra Wideband system and each tire transponder. This allows distance recognition to within 1 cm. The three transponders provide three distances to the sensor which is used to triangulate the sensor location (FIG. 1). This would eliminate the current practice of a vehicle operator having to manually identify which of the tire transponders is mounted at which location on the vehicle 14. If an onboard UWB positioning system already exists for PEPS functions, the tire pressure sensor location system would be a subset UWB system reducing the cost of the function.

For the passive target mode, the vehicle's UWBX(s) can be used in a radar mode to function similar to radar applications such as Intrusion Sensing, Child Left Behind Detection, Occupant Classification for seat belt tensioning or airbag deployment control, Occupant State of Health (posture), Exterior perimeter scanning for Object Detection for Crash Detection, Blind Zone Detection, Backup Aid.

By combining the active and passive modes a Security Threat Detection with Automated Panic function can be implemented. Security Threat Detection utilizes the vehicle's UWBXs which allows position range and tracking of electronic tags (fob/cellphone) as well as passive targets both inside and outside the vehicle. When the tag is within range of the vehicle, if the motion of the tag carried by the operator approaching the vehicle indicates rapid movement, a panic situation is identified and the vehicle's horn is activated. Alternatively, motion of potential intruder targets are detected by passive radar scanning, and if detected, vehicle perimeter lights enabled to indicate location, lights at location of intruder can flashed to further discourage the intruder, and warning status send to operators electronic key with haptic or audible feedback.

Accordingly, a passive entry passive start (PEPS) vehicle security system (e.g. the system 10), and a controller 18 for the system 10 configured to thwart a relay attack on the system 10 is provided. Using the time-of-flight (TOF) determining capabilities associated with ultra wideband transceivers (UWBXs) or devices to determine distance instead of signal strength solves the long standing problem of how to prevent relay attacks. Furthermore, using UWBXs provides for long range electronic key location to facilitate new functions beyond passive entry & passive start such as approach lights, hot cabin window control, automatic start, etc.; provides algorithm inputs and secure communication protocol for electronic key location that prevents relay attacks as it replaces the current low frequency/ultra-high frequency (LF/UHF) system currently in use along with the associated large antennas; reduces weight and increase flexibility for component placement; and reduces the transmitter power requirements due to frequency and bandwidth associate with UWBXs, typically 0.05 to 10 mW for tens to hundreds of meters of range.

While this invention has been described in terms of the preferred embodiments thereof, it is not intended to be so limited, but rather only to the extent set forth in the claims that follow.

We claim:

1. A passive entry passive start (PEPS) vehicle security system configured to thwart a relay attack on the system, said system comprising:
    a first ultra wideband transceiver (UWBX) installed on a vehicle and configured to transmit a request pulse at a request time;
    a mobile UWBX installed in a nomadic device and configured to transmit a reply pulse in response to the request pulse; and
    a controller configured to determine a distance between the first UWBX and the mobile UWBX based on a first time interval between the request time and a first time that corresponds to when the reply pulse is received by the first UWBX, wherein the controller is further configured to unlock doors of the vehicle only if the distance is less than an unlock threshold.

2. The system in accordance with claim 1, wherein the request pulse includes a vehicle identification.

3. The system in accordance with claim 1, wherein the reply pulse includes a nomadic device identification.

4. The system in accordance with claim 1, wherein the reply pulse includes a vehicle identification from the request pulse.

5. The system in accordance with claim 1, wherein the system further comprises a second UWBX installed on a vehicle, and wherein the controller is further configured to determine a direction from the vehicle to the nomadic device based on the first time interval and a second time interval between the request time and a second time that corresponds to when the reply pulse is received by the second UWBX.

6. The system in accordance with claim 5, wherein the system further comprises a third UWBX installed on a vehicle, and wherein the controller is further configured to further determine the direction from the vehicle to the nomadic device based on the first time interval, the second time interval, and a third time interval between the request time and a third time that corresponds to when the reply pulse is received by the third UWBX.

7. The system in accordance with claim 1, wherein the controller is further configured to prevent unlocking of a door lock of the vehicle if the distance is greater than a lock threshold.

8. The system in accordance with claim 1, wherein the controller is further configured to allow passive starting of the vehicle by pressing a start button only if the distance indicates that the nomadic device is inside the vehicle.

9. A passive entry passive start (PEPS) vehicle security controller configured to thwart a relay attack on a PEPS system, said controller comprising:
    a processor configured to operate one or more UWBXs to determine a distance between a first UWBX coupled to the controller and a mobile UWBX located apart from the controller, said distance based on a first time interval between a request time that corresponds to when the first UWBX transmits a request pulse at a request time, and a first time that corresponds to when a reply pulse is received by the first UWBX from the mobile UWBX, wherein the controller is further configured to unlock doors of the vehicle only if the distance is less than an unlock threshold.

10. The controller in accordance with claim 9, wherein the controller is further configured to determine a direction from the vehicle to the nomadic device based on the first time interval and a second time interval between the request time and a second time that corresponds to when the reply pulse is received by a second UWBX.

11. The controller in accordance with claim 10, wherein the controller is further configured to further determine the direction from the vehicle to the nomadic device based on the first time interval, the second time interval, and a third time interval between the request time and a third time that corresponds to when the reply pulse is received by a third UWBX.

12. The controller in accordance with claim 9, wherein the controller is further configured to lock doors of the vehicle if the distance is greater than a lock threshold.

13. The controller in accordance with claim 9, wherein the controller is further configured to allow passive starting of the vehicle only if the distance indicates that the nomadic device is inside the vehicle.

* * * * *